July 23, 1968  C. S. ASKEW  3,393,916

SHAFT SEAL

Filed Dec. 27, 1965

INVENTOR.
CRAWFORD S. ASKEW

BY John Cyril Malloy

ATTORNEY.

United States Patent Office 3,393,916
Patented July 23, 1968

3,393,916
SHAFT SEAL
Crawford S. Askew, 5120 SW. 98th Avenue Road,
Miami, Fla. 33165
Filed Dec. 27, 1965, Ser. No. 516,476
15 Claims. (Cl. 277—83)

ABSTRACT OF THE DISCLOSURE

A seal seat assembly and seal assemly used with a rotatable shaft extending through tubular housing including a tubular member including a flange at one end in which the flange has an outer seal seat and inner groove in axial, spaced relation from a clamp nut threaded on the other end of the member, a carrier slidably and expandably engaged between said nut and flange and having resilient, compressible O-ring means for clampingly engaging the housing and retaining the seal seat in a fixed position relative to the housing, and a seal assembly on said shaft having a lubric seal urged into engagement with the outer seal seat of said flange and including an inner tubular wall upon which said lubric seal is circumposed and in which said inner wall is engaged in an annular undercut portion surrounded by said flange seal seat for orienting said lubric seal in axial relation to the flange.

This invention relates to a sealing means for a housing having an opening with the shaft passed through the opening.

As is perhaps well known, it is quite often a problem to support the end of a shaft projecting through the opening of a housing in such a way that fluid materials inside the housing, such as oil, will not leak through the passageway between the side walls of the opening and a shaft rotating in the opening.

It is an object of the present invention to teach a sealing means for use in sealing the opening of a housing through which a shaft which rotates passes and provides support for the shaft.

It is another object of this invention to provide an adequate sealing means for a shaft projecting through a sleeve-type opening of a housing for supporting the free end of the shaft and prohibiting the passage of fluids through the opening between the shaft and the side walls thereof.

It is another object of this invention to provide a sealing means for a shaft which is relatively inexpensive to manufacture, efficient in operation, strong and durable, and otherwise well dimensioned for the purposes intended, with the component parts of the seal being arranged such that the seal is readily aligned with the shaft and remains aligned in use in spite of some wear.

In accordance with these and other objects which will become apparent hereinafter, the instant invention will now be described with reference to the accompanying drawing in which.

Figure 1:
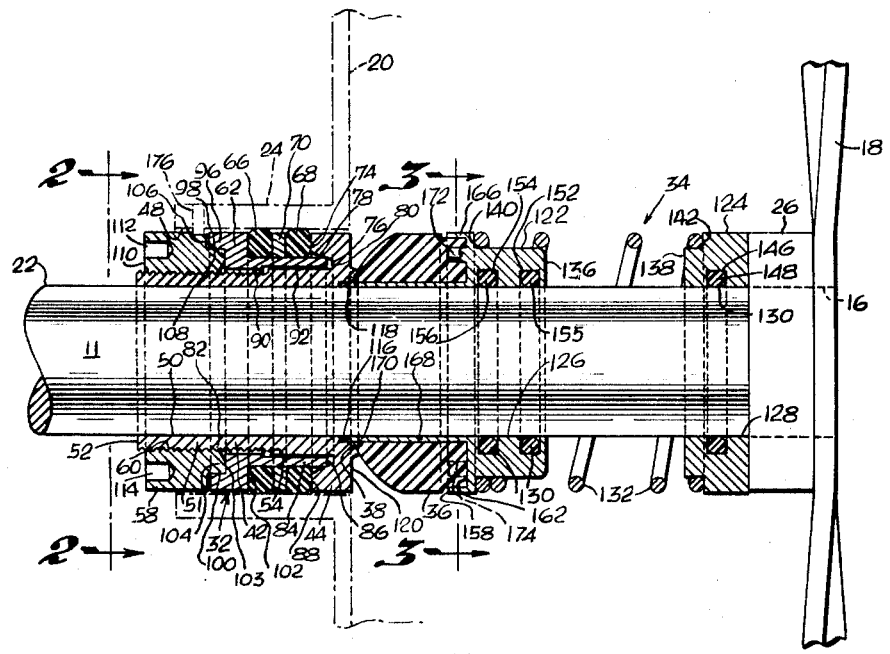
FIGURE 1 is a view, partly in cross section showing and illustrating the details of the instant invention.

Referring more particularly to the drawings wherein like reference characters designate like or corresponding parts throughout the different views and referring particularly to FIGURE 1, the numeral 11 generally designates a rotary shaft or arbor having an end 16 with a member, such as an impeller indicated by the numeral 18, keyed thereto for rotation within a housing structure, the outline of the housing structure being indicated by the numeral 20. The free end 22 of the shaft projects outwardly of the housing structure through a tubular portion of the housing, such as that indicated by the numeral 24. In most applications a plate 26 is ordinarily encountered fixed to the shaft 11 in the housing so that it will not slide lengthwise on the shaft. It is between the plate 26 and the tubular opening 24 of the housing that the seal, now to be described, is utilized to support the free end of the shaft 11 in the tubular portion 24 for rotation while at the same time sealing the tubular opening of the housing structure so that it is fluid tight while the shaft rotates.

The seal includes two main assemblies: (1) the nonrotary seat assembly 32 which is snugly retained in the tubular opening 24 in a manner to be described in the next paragraph, and (2) the seal assembly 34 which, as is also to be described in the following paragraphs, is mounted for rotation with the shaft in the housing and positioned axially on the shaft so that a seal member 36 carried on the seal assembly is urged into sealing relation with a seal seat 38 in the confronting face of the seat assembly.

Figure 2:
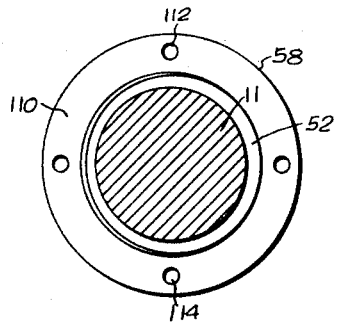
FIGURE 2 is a view in cross section taken along the plane indicated by line 2—2 of FIGURE 1 and looking in the direction of the arrow.
Figure 3:
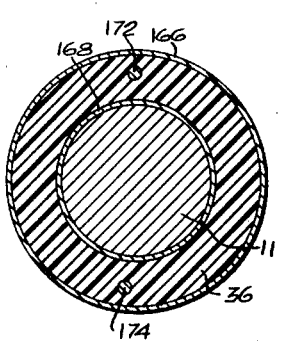
FIGURE 3 is a view in cross section taken along the plane indicated by line 3—3 of FIGURE 1 and looking in the direction of the arrow.

Referring first to the seat assembly, which is best seen in FIGURE 2, it will be seen that it comprises four main portions: (1a) a flanged sleeve-type member 42 sized so that the outer diameter of the flange 44 is adapted to be snugly fit within the cylindrical housing opening 48 adjacent the opening into the housing chamber proper and the shaft is rotatable within the central axial bore 50 of this member, the main length 51 of the flanged member being threaded from the extending end 52 to a shoulder 54 intermediate the length thereof; (1b) a nut 58 having a threaded bore 60 adapted to be threadably moved axially on the flanged member toward the main housing body; (1c) a carrier 62 slideably captivated between the nut 58 and the flange 44 and of an axial length less than that of the flanged member 42; (1d) a plurality of O-rings, such as 66 and 68, exteriorly circumposed on the carrier with a ring-type washer 70 between them. The said portions are arranged and sized so that on threaded travel of the nut 58 toward the flange 44 of the flanged member, the O-rings will be deformed and expanded radially outwardly to flatten and hold against a length of the interior walls of the tubular opening 24. The face of the flanged member, which faces the housing interior, is provided with the aforesaid seal seat or recess 38 sized for companulate relation with the seal member 36 of the seal assembly 34 to be described in the following paragraph. Referring more particularly to the flanged member, the face 74 of the flange 44 which faces the threaded end 52 and the shaft end 22 is provided with an annular indentation 76 the outer wall 78 of which is slightly tapered to a floor surface 80 defining a common plane perpendicular to the axis of the bore 50 and, preferably, the distance between the floor surface and the shoulder 54, at the terminal depth of the threads 82, is equal to or somewhat less than a projecting sleeve portion 84 of the carrier so that, as the nut 58 is tightened on the threaded end of the flanged member, the carrier will be centered about the shaft axis so the thickness of the end 86 thereof is guided by the tapered outer indentation wall 78 and the O-rings are compressed by the distal end 88 of the flange 44 and the nut 58. With respect to the carrier configuration illustrated, also seen in FIGURE 1 of the drawings, it includes the aforesaid projecting sleeve portion 84 with the through bore 90 and a counter bore 92 sized for slideable movement over the threaded and thread-free surfaces of the flanged member. It is noted that the outer face 96 of the carrier also includes a step 98 defining counter bore 100 for a purpose to be described. Further in the preferred embodiment the carrier is provided with a shoulder 102 intermediate its outer length so that the surface of the shoulder which confronts the flange face actually forces the O-rings into the shape shown on the tightening of the nut. Turning now to the configuration of the nut 58, which is threaded internally to engage the threaded exterior of the flanged member, the leading face 103 thereof is provided with a cylindrical portion 104 of reduced diameter to extend into the counter bore 100 of the carrier and a recessed rim 106 of sufficient axial depth so that the confronting face 108 of the carrier does not bear thereon when the nut 58 is tightened. The dimensions of the undercut are preferably such that there will be a small clearance between the face 108 of the carrier and that of the nut of the magnitude of about one thirty-second of an inch when the O-rings are thoroughly compressed. The trailing surface of the nut 110 may be provided with a plurality of spanner wrench recesses such as 112 and 114 to accommodate the ready tightening thereof. Also, the face of the flanged member having the seal seat 38, as is seen in FIGURE 1, is counterbored as at 116 providing an annular guide for a purpose to be described. Preferably, the seal seat face of the flanged member is provided with an annular axially extending projection 118 of reduced diameter the face of which is dish-shaped, that is, departs angularly from the outermost plane of the face 120 toward the thread end of the flanged member and radially inwardly. While the term dish-shaped is used to describe the seal seat, it will be apparent hereinafter that various configurations for a seal seat may be provided, such as an inwardly converging cone-shaped recess, parabolic recess, dome-shaped recess or a stepped cone recess.

It is thus apparent that when the flanged member has been slideably passed over the shaft and snugly positioned into the opening of the tubular housing as indicated in FIGURE 1, the nut 58 may be tightened and this will cause axial forces to be exerted on the O-rings to expand them and that by reason of the structure the seat assembly will actually align itself so that all cross sections thereof are in a centered, that is, perpendicular to the center line of the shaft, and that the O-rings will tightly seal against any fluid passage between the interior wall of the tubular housing and the seal seat assembly. The cylindrical portion 104 of the leading face 103 of the nut 58 will, on tightening of the nut 58, drive the carrier along substantially parallel lines which are parallel to the shaft center line and that of the tubular opening, the carrier being progressively forced into a precisely centered position as the end 86 is guided by the tapered outer indentation wall 78 toward the desired aligned position shown.

Figures 4, 5, 6:
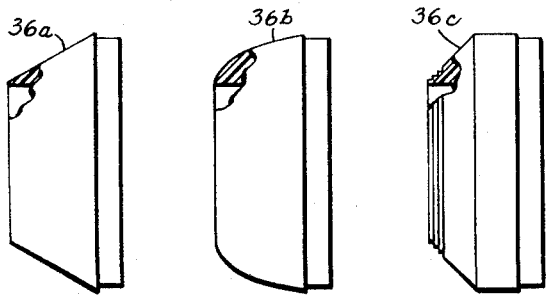
FIGURES 4, 5 and 6 are views in elevation of alternate embodiments of the seal member carried by the seal assembly of the seal now to be described.

The seal assembly generally designated 34 is adapted to be rotatably fitted on the shaft in the housing at a predetermined axial position depth-wise, as will be apparent. The seal assembly comprises five main portions: (1) and (2) a first and a second spaced member 122 and 124, respectively, on the shaft each having a snugly fitting center bore 126 and 128 extending therethrough; (3) means 130 to connect both of the members for rotation with the shaft with the innermost or secod member in a fixed axial position on the shaft and the second member free for limited axial movement on the shaft relative to the first member; (4) resilient means 132 normally to urge the first member 122 away from the innermost or second member 124; and (5) the seal member 36 of lubric material carried on the outside face of the first member to engage the seal seat 38. Each of the confronting faces 136 and 138 of the members 122 and 124 are provided with a coil spring seat 140 and 142 respectively to accommodate the compressed spring 132. In the embodiment shown, in the members 122 and 124 annular recesses 146, 152 and 154 are provided in the walls of their respective central bores and an O-ring 148, 155 and 156 having a dimension sufficiently large so as to be compressed into the recess in tight circumposed relation on the shaft circumference to hold the shaft and the second members for rotation together. The second member, in the embodiment shown, is restricted from axial movement depth-wise into the housing by the backup plate 26 which is located conveniently as indicated. The seal face 158 of the first member, that which faces outwardly, that is, toward the spring seat 140 is provided with an axialy opening annular recess 162 which is cup-shaped defining an outside wall 166 for the recess, of a thickness not less than one thirty-second of an inch, and an interior wall 168 of the recess, which is also not less than one thirty-second of an inch, and which interior wall snugly rides with the shaft. The interior wall 168 of the first member is of a greater axial length than that of the outside wall 166 so that, in assembly, the distal end 170 projects into the counter bore recess 116 of the seal seat face of the flanged member. A plurality of pins, such as 172 and 174, project axially into the axially facing cup-shaped annular recess 162 of the first member and are carried in suitable recesses, not shown, in the floor of the recess. The seal 36 of the lubric material, which is nose-shaped is provided with an axial bore therethrough and is configured such that it is adapted to be tightly but replaceably held in the recess of the first member. The nose-shaped seal 36 is of a diminishing cross-sectional area with the distal end thereof terminating short of the distal end of the interior wall 168 of the axially facing cup-shaped annular means 162. It will be apparent that when mounted in the manner indicated in the drawings, the seal will be urged into sealing relation with the seal seat of the seat assembly and that as the seal wears the spring will continue to urge it into sealing relation. While various configurations 36, 36a, 36b and 36c are shown in FIGURES 1, 4, 5 and 6, respectively, and may be used for the seal constructions, it has been found that the stepped cone configuration 36c of FIGURE 6 is the preferred construction with the seal seat being cone-shaped, so that, as a result there is a wedge type of action which tends to center the entire seal on wear and present a satisfactorily small wearing surface; the seal is preferably manufactured from "Teflon" and/or a ceramic material.

In most applications of the seal taught herein, the back-up plate will be found to be included on the shaft; however, if such a plate or collar is not present, the second member 124 may include means to hold it in the desired axial position, the means comprising a collar on the second member carrying a set screw or the like, or indeed, the O-ring 148 may be designed to give the second member satisfactory holding power so that it remains in position and provides a base against which the load of the spring 132 may exert the force required to urge the seal carrying first member into sealing engagement with the seal seat assembly. Further, in certain applications, it may be desired to utilize set screws to pass through radial openings in the tubular housing 24, the openings being indicated by the numeral 176, to engage the shaft and add extra holding power against axially directed forces. Also, the surface of the carrier, which enters the axially facing recess of the flange and is guided into centered position by the wall 78, may be companulately tapered so as to mate with the wall 78.

It has been found desirable for the projection for the face or portion of the flanged member in which the seal seat recess is located to be in the range of one-eighth to three-eighths inch and that the preferred axial projection be three thirty-seconds of an inch and that the radial distance of the seal seat, as seen in elevation, be of the same range and dimension.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A stationary seat assembly for a rotatable shaft extending through a tubular opening in a housing in which said seat assembly comprises: a sleeve-type member with an axial bore therethrough and having a radially extending flange intermediate its length and slidably and snugly received in the tubular opening, said axial bore rotatably receiving the shaft therein, said member having exterior threads on one end, a groove in the flange facing the threaded end, and a dished seat on the face of the other end of the member; a threaded nut of an outside diameter not more than substantially equal to the outside diameter of the flange, on the threaded end of said flanged member adapted to be threadably traveled toward the flange; a carrier slidably captivated between the nut and the flange and of an axial length less than that of the flanged member, the exterior surface of the carrier having a surface of an outside diameter less than that of the flange, said carrier reciprocably received in the groove of the flange; at least one resilient O-ring circumposed on the carrier and being radially expandable to an outside diameter greater than that of the outside diameter of the flange on compression between the nut and the flange on tightening of the nut to expand the O-ring and snugly holding the seat assembly in fluid tight relation in the tubular opening.

2. The seat assembly as claimed in claim 1 including a second resilient O-ring circumposed on said carrier, and a spacer washer disposed therebetween.

3. A seat assembly as set forth in claim 1, wherein the dished seat as seen in elevation is of a radial thickness no less than one-sixteenth inch and not greater than five-sixteenths inch.

4. A seat assembly as set forth in claim 1 wherein said flanged member is provided with a counter bore in said face to define an annular recess of a slightly greater diameter than that of the axial bore and having a common centerline.

5. A seat assembly as set forth in claim 1 wherein the face of the flanged member includes an axially extending portion provided with a dished seal seat in the face of the portion of a radial thickness as seen in elevation which is not less than one sixteenth of an inch and not more than five sixteenths of an inch.

6. A seat assembly as set forth in claim 4 wherein the face of said flanged member is provided with a counter bore to define an annular recess of a radial thickness greater than one thirty-second of an inch and not more than one-eighth of an inch.

7. A seat assembly as set forth in claim 1 wherein the carrier includes a flanged portion defining a shoulder one face of which confronts the flange of the flanged member.

8. A seat assembly as set forth in the claim 6 wherein the other face of the flange of said carrier is provided with a counter bore and the face of said nut confronting said carrier is provided with a circumferentially extending recess of an axial depth slightly greater than the counter bore of said carrier.

9. A seat assembly as set forth in claim 1 wherein said nut is provided in the exterior face thereof with a plurality of axially extending holes to accommodate a spanner wrench to forcibly turn the nut on the flanged member.

10. A seat assembly as set forth in claim 1 wherein said nut is provided with a counter sunk hole in the peripheral surface thereof to receive a set screw.

11. A stationary seal seat assembly and a shaft seal for use in combination with a housing having a tubular opening and a rotatable shaft projecting through said opening, in which said seal seat assembly comprises:

(a) a sleeve-type member with an axial bore therethrough and having a flange intermediate its length slidably and snugly fitting the tubular opening said axial bore having a diameter permitting rotation of the shaft therein, and said member having exterior threads on one end, a groove in the flange facing the threaded end, and a dished seat on the face of the other end of the member;

(b) a threaded nut of an outside diameter not more than substantially equal to the outside diameter of the flange threaded on the end of said flanged member and engaged on said threaded end for movement toward the flange;

(c) a carrier slidably captivated between the nut and the flange and of an axial length less than that of the flanged member, the exterior surface of the carrier having a surface of an outside diameter less than that of the flange, said carrier having a portion reciprocably received in the groove of the flange; and (d) at least one resilient O-ring circumposed on the carrier for radial expansion to an outside diameter greater than that of the outside diameter of the flange on compression between the nut and the flange on tightening of the nut to expand the O-ring and snugly hold the seal assembly stationary in said housing and in fluid tight relation with the walls of the tubular opening;

said seal assembly including:

(a) (b) a first and a second spaced member on the shaft;

(c) means connecting both said members for rotation with the shaft with the first member in a fixed axial position on the shaft and the second member free for limited axial movement on the shaft relative to the first member; and (d) resilient means connected intermediately of said members normally urging the second member away from the first member; said second member comprising:

(b)1 a tubular member having an axial bore therethrough to snugly fit the shaft and having an annular recess in the outside face defining an outside wall and an interior wall of the recess each of a radial thickness not less than one thirty-second of an inch, said interior wall being of a greater axial length than that of the outside wall, and (b) 2 a seal member of lubric material in the annular recess and having an outwardly facing nose configured with a diminishing cross-sectional area abuttingly seating in the dished seat of the seal seat assembly.

12. A stationary seal seat assembly an a shaft seal for use in combination with a housing having a tubular opening and a rotatable shaft projecting through said opening, in which said seal seat assembly comprises:

a sleeve-type member with an axial bore therethrough and having a flange intermediate its length and slidably and snugly fitting the tubular opening, said axial bore having a diameter permitting rotation of said shaft therein, means on said sleeve-type member for fixedly retaining said sleeve-type member in sealed, fixed relation to said tubular opening, said sleeve-type member flange including an annular seat surrounding said shaft and opening toward said seal assembly, said flange including a counterbored portion forming an axial recess circumposed by said annular seat and surrounding said shaft;

said seal assembly comprising:

first and second members spaced axially on said shaft, means connecting said members on said shaft for rotation therewith, said second member being disposed adjacent said annular seat and having limited axial movement on said shaft, resilient means disposed between said first and second members and normally urging said second member toward said annular seat, said second member comprising a tubular member having an axial bore snugly fitting said shaft, said tubular member having an annular recess opening toward said annular seat and defining annular outside and interior walls, said interior wall having an axial length greater than said outside wall, said interior wall being telescopically received in said axial recess formed by said counterbored portion of said sleeve-type member flange, and an annular seal of a lubric material circumposed about said interior wall and having one portion fixedly retained in the annular recess of said tubular member and a terminal nose portion diverging from said annular seat and engaged therein, said nose portion terminating intermediately of said inner wall whereby said inner wall orients said seal as wear occurs thereon.

13. The structure as claimed in claim 12 in which said lubric material is "Teflon."

14. The structure as claimed in claim 12 in which said seal is of a ceramic material.

15. The structure as claimed in claim 12 in which said tubular member includes means projecting axially from said recesses and extending into an adjacent portion of said annular seal for preventing relative rotation therebetween.

References Cited

UNITED STATES PATENTS

| | | | |
|---|---|---|---|
| 836,408 | 11/1906 | Somes | 277—91 |
| 2,233,599 | 3/1941 | Gilbert | 277—87 |
| 2,444,249 | 6/1948 | Estey | 277—87 |
| 2,479,711 | 8/1949 | Arutunoff | 277—91 X |
| 2,501,984 | 3/1950 | Alward | 277—93 |
| 3,288,474 | 11/1966 | Gits | 277—83 X |

FOREIGN PATENTS

| | | |
|---|---|---|
| 715,603 | 9/1954 | Great Britain. |
| 858,447 | 1/1961 | Great Britain. |

LAVERNE D. GEIGER, *Primary Examiner.*

J. MEDNICK, *Assistant Examiner.*